United States Patent
Choiniere (10) Patent No.: US 11,244,184 B2
(45) Date of Patent: Feb. 8, 2022

(54) HYPERSPECTRAL TARGET IDENTIFICATION

(71) Applicant: BAE SYSTEMS Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 203 days.

(21) Appl. No.: 16/782,108

(22) Filed: Feb. 5, 2020

(65) Prior Publication Data

US 2021/0241014 A1   Aug. 5, 2021

(51) Int. Cl.
*G06K 9/20* (2006.01)
*G06K 9/62* (2006.01)

(52) U.S. Cl.
CPC .......... *G06K 9/2018* (2013.01); *G06K 9/623* (2013.01); *G06K 9/6288* (2013.01); *G06K 2209/21* (2013.01)

(58) Field of Classification Search
CPC .... G06K 9/2018; G06K 9/623; G06K 9/6288; G06K 2209/21
See application file for complete search history.

(56) References Cited

U.S. PATENT DOCUMENTS

| | | | |
|---|---|---|---|
| 6,282,301 B1* | 8/2001 | Haskett | G06K 9/0063 382/103 |
| 2008/0063237 A1* | 3/2008 | Rubenstein | G06K 9/0063 382/103 |
| 2010/0322471 A1* | 12/2010 | Treado | G01N 21/359 382/103 |
| 2013/0044963 A1* | 2/2013 | Robinson | G06T 7/194 382/260 |
| 2015/0235102 A1* | 8/2015 | Blagg | G06K 9/52 382/191 |
| 2016/0065915 A1* | 3/2016 | Potter | H04N 9/09 348/273 |

* cited by examiner

*Primary Examiner* — Fayyaz Alam
(74) *Attorney, Agent, or Firm* — KPIP Law, PLLC (57) ABSTRACT

The system and method for hyperspectral target identification provides for sue of a sensor array such that for a 2 by 2 pixel, each pixel is set to a different wavelength by employing a band pass filter, so that one can determine whether a cluster set is of a natural object or a man-made object. Using ratios of the collected energy within the partitioned sub-bands one can make near real-time declarations about targets and in some cases, friend or foe determinations.

18 Claims, 6 Drawing Sheets

HYPERSPECTRAL TARGET IDENTIFICATION

FIELD OF THE DISCLOSURE

The present disclosure relates to automatic target recognition and more particularly to using hyperspectral analysis that in some embodiments includes visible (VIS), near infrared (NIR), short wave infrared (SWIR), and long wave infrared (LWIR) detection.

BACKGROUND OF THE DISCLOSURE

Current methods for searching and identifying targets typically use amplitude measurements across the entire band of interest using simple contrast measurements between targets and the background scene. This can be problematic, for example, where beige buildings are clearly depicted in color images but are completely lost in black and white photographs against a tree background. The total collected energy of the trees in the visible range is equivalent to the beige building when using a broadband imager. The spectral response of the trees and the beige buildings are clearly different but these differences are not measured with the full band visible imager. This is somewhat analogous to black and white TV versus color TV. The system of the present disclosure applies across all bands where further information on the scene can be discerned by implementing hyperspectral measurements within the band. Wherefore it is an object of the present disclosure to overcome the above-mentioned shortcomings and drawbacks associated with conventional automated broadband target recognition.

SUMMARY OF THE DISCLOSURE

One aspect of the present disclosure is a method for hyperspectral target identification, comprising: mapping specific wavelengths and bandwidths to each of a plurality of pixels on a sensor array; calculating ratios between pixel pairs from the plurality of pixels on a sensor array, wherein at least four pixels are used for calculating ratios and one of the four pixels is used as a reference pixel; and eliminating clutter from an image comprising the plurality of pixels on a sensor array based on the calculated ratios using a programmable logic device having contrast spatial filters. One embodiment of the method for hyperspectral target identification is wherein the programmable logic device is an FPGA.

Another embodiment of the method for hyperspectral target identification is wherein the elimination of clutter includes the removal of vegetation from the image. In some cases, the elimination of clutter from the image further comprises using confidence levels to determine whether an object is vegetation, water, soil, or some other object.

Still yet another embodiment of the method for hyperspectral target identification is wherein the method continues by shifting a single pixel and repeating the process, pixel by pixel, row by row across the plurality of pixels on a sensor array. In some cases, the method further comprises using automatic target recognition (ATR) to differentiate between target types based on a priority list.

In some embodiments the method for hyperspectral target identification further comprises using a fusion approach comprising additional sensor data and prost processing.

Another aspect of the present disclosure is a method for hyperspectral target identification, comprising: mapping specific wavelengths and bandwidths to each of a plurality of pixels on an FPGA sensor array; calculating ratios between pixel pairs from the plurality of pixels on an FPGA sensor array, wherein at least four pixels are used for calculating ratios and one of the four pixels is used as a reference pixel; and eliminating clutter from an image comprising the plurality of pixels on an FPGA sensor array based on the calculated ratios using contrast spatial filters to provide real-time processing.

Another embodiments of the method for hyperspectral target identification is wherein the at least four pixels is a 2×2 pixel grouping a $1^{st}$ pixel is full band of the sensor, a $2^{nd}$ pixel is 1.05 µm, a $3^{rd}$ pixel is 1.50 µm, and a $4^{th}$ pixel at 1.95 µm, wherein the wavelengths are defined by the spectral response of the target and the clutter to be removed.

Still another embodiment of the method for hyperspectral target identification is wherein the method continues by shifting a single pixel and repeating the process, pixel by pixel, row by row across the plurality of pixels on an FPGA sensor array. In some cases, the method further comprises using automatic target recognition (ATR) to differentiate between target types based on a priority list.

One aspect of the present disclosure is a system comprising a SWIR imager with 2 by 2 pixel combinations containing bandpass filters. In the 2 by 2 pixel, with each pixel set to a different wavelength by employing a band pass filter, one can determine whether a cluster set is of a natural object or a man-made object. Using ratios of the collected energy within the partitioned sub-bands one can make near real-time declarations about targets and in some cases, friend or foe determinations In one embodiment of the system using having a 2 by 2 pixel set, where each pixel is assigned a band. In one embodiment, a 2×2 pixel grouping has a $1^{st}$ pixel is full band of the sensor, a $2^{nd}$ pixel is 1.05 µm, a $3^{rd}$ pixel is 1.50 µm, and a $4^{th}$ pixel at 1.95 µm, wherein the wavelengths are defined by the spectral response of the target and the clutter to be removed. In some cases, using measurements at these bands one can determine ground or vegetation and friend or foe camouflage netting. By making a series of hyperspectral measurements of an object in question at long ranges within an image, where the 2 by 2 pixel spatial extent covers the intended target, the system can remove the scene containing ground or vegetation and focus the processing power on objects that remain after the first processing filter.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

As the development of the use of automatic target recognition (ATR) for target identification accelerates, limitations in typical single band imagers are becoming apparent. In some cases, target ID ATR looks at images relative to a target library. This requires a lot of processing power for the endless number of target types and potential poses. Once covered with camouflage or otherwise obscured, an ID detection probability decreases. According to one example, by knowing a grouping of pixels represent a camouflage covered structure, as taught herein, the grouping of pixels can be assigned a targeting priority relative to other objects in the Field of View (FOV) of the sensor.

In one embodiment of the system of the present disclosure, by adding spectral imaging capabilities the ability to detect spectral signatures unique to the target sets is possible. Coupled with other sensors, the algorithm of the present disclosure can be based on a most likely target. For example, if out of a 500 meter by 500 meter area, only two areas/potential targets appear to be viable and everything else is not man-made then that is a very valuable piece of information, particularly when coupled with a LWIR imager.

One embodiment of the system of the present disclosure uses a pixel cluster (e.g., 2 by 2 or 2 by 3) to provide a localized sample of an object and determines if the potential object is man-made or not. In certain cases, one is interested in detecting items under camouflage. Visible cameras are typically ineffective with camouflage. In certain embodiments, a SWIR imager is tuned to identify camouflage by the spectral signature contained in the image. In certain embodiments, the technique can be applied to paints, and man-made structures that have a particular signature contained within the fine structure of the SWIR reflected light. For example, camouflage in a certain part of the spectrum looks black. This coupled with data in the adjacent pixel (broadband) produces a ratio that triggers detection of a potentially man-made object. This data coupled to a similar adjacent cluster reveals a man-made structure. In certain embodiments one can also estimate the size and shape of an object for further identification.

In one embodiment, a hyperspectral SWIR (short wave infrared) imager is coupled with a LWIR (long wave infrared) imager. In another embodiment of the present disclosure, a hyperspectral SWIR imager is coupled with a 3D LIDAR. Several pieces of orthogonal information can be compiled to determine the present of a target ID. This approach uses orthogonal sensor information and the combination of sensors provides clutter reduction where a single sensor is insufficient.

Figure 1:
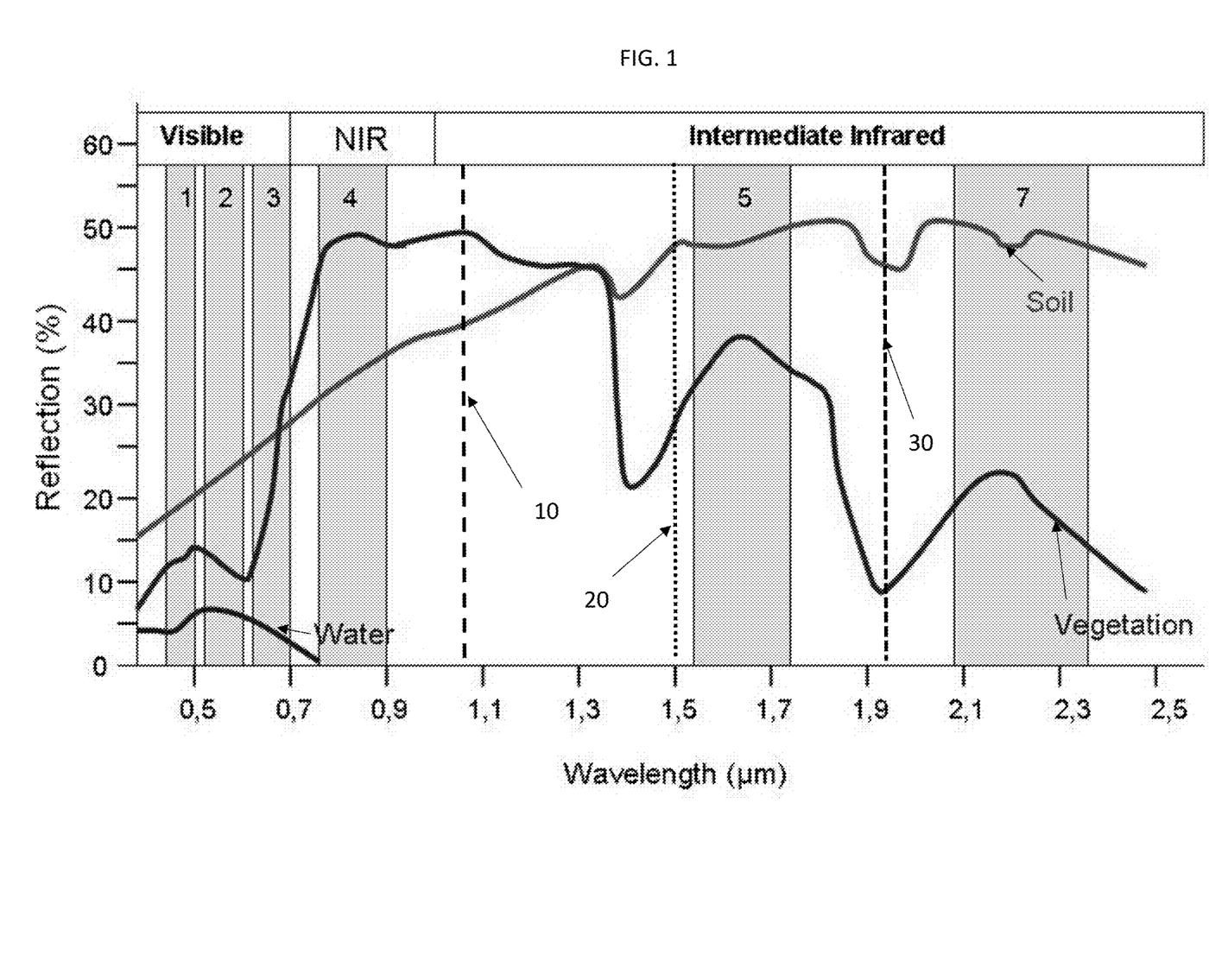
FIG. 1 is a plot of percent reflection versus wavelength ranging from the visible through the intermediate infrared and comparing the reflectance of soil, vegetation, and water.

Referring to FIG. 1, a plot of percent reflection versus radiation wavelength (ranging from the visible through the intermediate infrared) compares the reflectance of soil, vegetation, and water. More specifically, the reflectance across the SWIR Band for water 2, vegetation 4, and soil 6 is shown (FIG. 1) having distinct reflectance profiles. There, it is also possible to see three wavelength values shown as lines (10, 20, 30) that have been selected for creating a ratio representing a divergence of reflectance. In one embodiment, a first line 10 is around 1 μm, a second line 20 is around 1.5 μm and a third line 30 is around 1.9 The first line 10 indicates a reflectance of about 40% soil and 50% vegetation. The second line 20 indicates a reflectance of about 47% soil and 27% vegetation. The third line 30 indicates a reflectance of about 45% soil and 10% vegetation.

In one embodiment, 50 nm band pass filters are placed at 1 um, 1.5 um and 1.9 um, and by using the 1.0 um as a reference a determination can be made. It is to be understood that any band can be the reference to form a ratio. For example, if the ratio of lines 1.0:1.5 μm (R1) is 0.60 and the ratio of lines 1.0:1.9 μm (R2) is 0.25, it is vegetation. In the case of soil, the ratios would be 1.25 and 1.2, respectively. In certain embodiments, a programmable logic device, e.g. an FPGA, is used for ratio processing. In some cases, an imaging sensor configured for processing an image at the particular wavelength includes a plurality of pixels in the sensor. In one example of the present system, the FPGA can flag a pixel grouping as vegetation or soil, thereby eliminating clutter from an image. In some cases, hyperspectral images provide additional information about a scene, one or more targets, and finding one or more targets within a scene. By partitioning the imaging sensor's band around specific wavelengths of interest in the clutter environment (e.g., vegetation), a FPGA can filter, or eliminate, vegetation clutter by looking for the particular pixel ratios that signify vegetation in near real-time. In one embodiment wavelength filters on the pixel are selected and code on the FPGA is written to look at all the various ratios and apply them to a look-up table, for example, for detection based on the particular ratios. By removing vegetation clutter, this leaves only the one or more targets within the scene by using the R1 and R2 ratios as depicted in FIG. 1. Further processing on the one or more targets, allows one to make high-level and confident target determinations.

Figure 2:
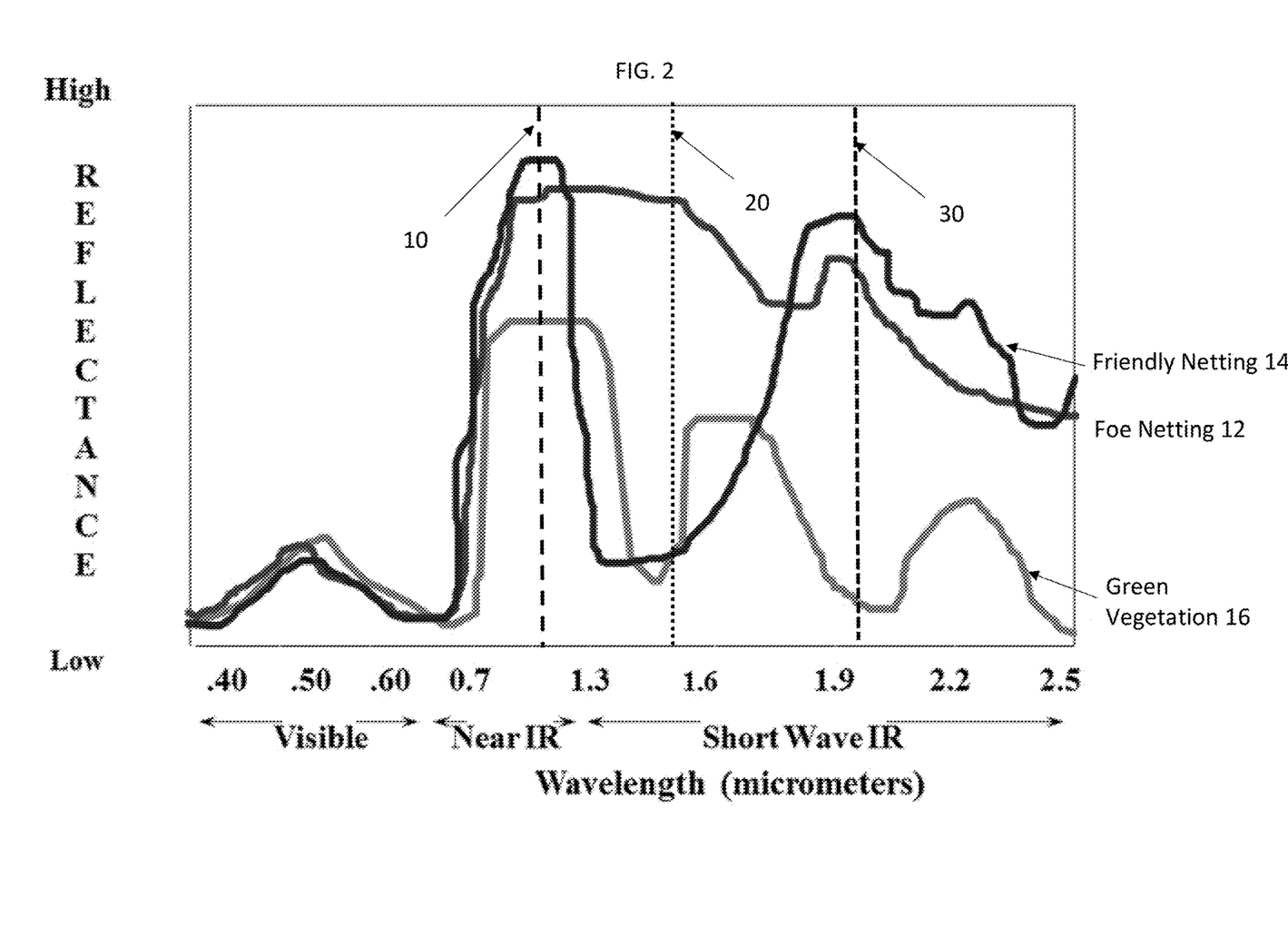
FIG. 2 is a plot of percent reflection versus wavelength ranging from the visible through the intermediate infrared and comparing the reflectance of vegetation, and netting used in the military context.

Referring to FIG. 2, a plot of percent reflection versus radiation wavelength (ranging from the visible through the intermediate infrared) compares the reflectance of vegetation, and camouflage netting used in the military context. More specifically, the reflectance across the wavelength range for a netting used by a foe 12, netting that may be used by friendly forces 14, and green vegetation 16 are shown. The friendly netting 14 is distinct from the foe netting because of the large reflectance variance at 1.6 μm (FIG. 2). Again using 1.0 μm as a reference, the ratio between 1.0 and 1.6 μm would yield 0.2 for friendly and 1.0 for foe. There, it is also possible to see three regions selected for creating a ratio representing a divergence of reflectance. In one embodiment, a first line 10 is around 1 μm wavelength, a second line 20 is around 1.5 μm wavelength and a third line 30 is around 1.9 μm wavelength.

Using the same approach as discussed previously, a 50 um bandpass filter is applied at 1.0, 1.5 and 1.9 um. In this example, vegetation would yield R1=0.3 (20%/60%) and R2=0.2 (15%/60%). For Foe netting the method would yield R1=1.0 (80%/80%) and R2=0.8 (65%/80%) and for Friendly netting the method would yield R1=0.2 (15%/60%) and R2=0.8 (65%/80%). The large variance in the ratios sets the higher confidence levels of the declaration. For example, a R1=1.0 would yield a high confidence of 1, while a R1=0.8 would yield a 0.6 confidence, and a R1=0.4 may only result in a 0.2 on a scale from 0 to 1. In some cases, the confidence interval is a simple scale indicating the level of confidence from the ratio readings based on empirical data collections. In certain embodiments of the system of the present disclosure, hyperspectral images provide additional information about a scene, one or more targets, and locating one or more targets within a scene. By partitioning the imaging sensor's band around specific wavelengths, FPGAs can filter through images and in near real-time to find one or more targets within a scene and make high level declarations by removing particular clutter form the image (e.g., vegetation).

Figure 3A:
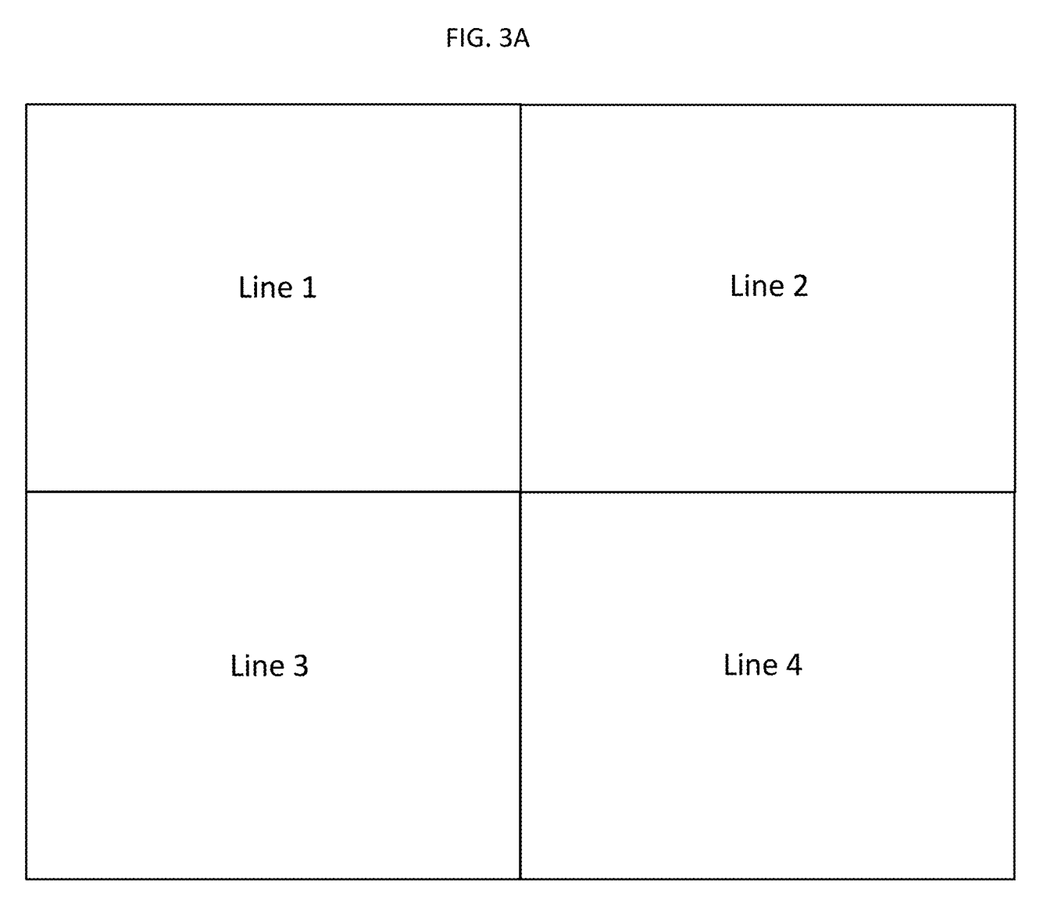
FIG. 3A is a diagram of a 2×2 pixel array for use in hyperspectral analysis according to the principles of the present disclosure.

Referring to FIG. 3A, a diagram of a 2×2 pixel cluster for use in hyperspectral analysis according to the principles of the present disclosure is shown. More specifically, in one embodiment a first line, a second line, and a third line (representing wavelength values) may be sampled such as in the SWIR band to differentiate between soil, vegetation, and friendly or foe camouflage as discussed previously. In one example there may be additional lines in the pixel clusters (e.g., a fourth line in a 2×2) may provide early detection that enables long range detections. For example, by looking at the amplitude responses in a 2×2 cluster, one can determine if something in the image is vegetation, camouflage, or soil. This combined with a LWIR sensor in a 2×2 configuration allows one to determine whether something is a warm object, a rock, or a man-made structure, and possibly whether something is friendly camouflage or that of a foe all from a 2×2 pixel grouping.

Figure 3B:
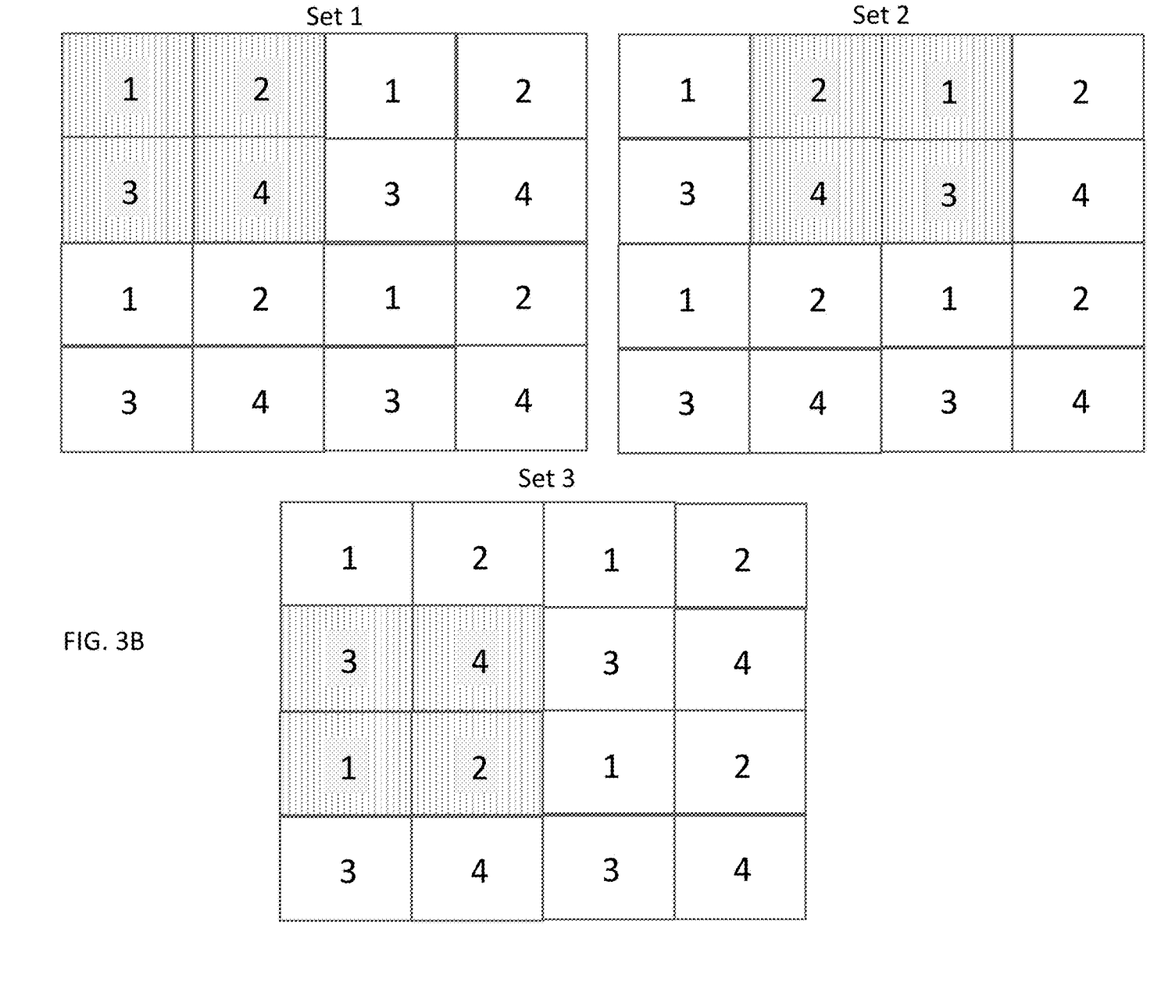
FIG. 3B is a diagram of a plurality of 2×2 pixel patterns according to one embodiment of the present disclosure for use in hyperspectral analysis according to the principles of the present disclosure and demonstrating that any grouping of four pixels (2×2) in an array will be processed as a unique group.

Referring to FIG. 3B, a diagram of a plurality of 2×2 pixel cluster patterns, grouped together to form a super pixel which is a subset of a larger array (10 by 10 to 2000 to 2000 pixels) to form an array according to one embodiment of the present disclosure for use in hyperspectral analysis according to the principles of the present disclosure and demonstrating that any four pixel grouping (2×2) in an array can be processed as a unique group. More specifically, each of Set 1, Set 2, and Set 3 have the same readings in each of the individual pixels across the 4×4 array and what is being demonstrated is that sets of four pixels (2×2) are assessed at a time and ratios are calculated to provide for information regarding the reflectance of particular objects at specific wavelengths for use in target identification. It is understood that 2×2, 2×3, 3×3, and the like could also be used depending on the bands selected. In one example as depicted in FIG. 3B, there is an array of pixels forming the sensor and out of the array, using a cascade approach for processing the measurements at three different wavelengths such that set 1, set 2 and set 3 represent the three different wavelengths. In set 1, group 1 is selected as the four pixels in the upper left quadrant. In set 2, the group 2 is selected as the four pixels in the upper central portion of the quadrant. This would continue down the row until it reaches the end of the row. In set 3, the start of a new row, group 3 utilizes the four pixels in the middle left quadrant and then will continue until the end of the row. This allows for each pixel to a measure a scene sample and uses its immediate pixel neighbors to generate the ratios needed for determinations for clutter, as described herein. In a further embodiment the values of the pixel cluster are analyzed and anomalies are excluded such that selected pixels represent the optimal pixel group. This processing approach allows every pixel to be tested relative to its neighbors for spectral response.

In situations where detection is occurring at an offset angle, identification of an object is impacted by the potential target's projection from that viewing angle. For example, a tank's front view (head on) is ½ the size of the side view or top view for the same vehicle. By design, the 2×2 pixel cluster for the smallest area at a viewing angle (front view) allows for the collection of more sample sets over the target's surface. In situations where detection is occurring in a direction normal to the detector, the system would still provide the largest number of samples for a given target by using a small pixel grouping. FPGA processing would account for any 2×2 pixel combination set being on the target by scanning row by row and column by column in a scanning process for every 2×2 pattern, as shown in FIG. 3B. In certain embodiments, line filters may also be used for detection of a signal in a narrow or wider range depending on the clutter and the targets sets of interest.

Figure 4:
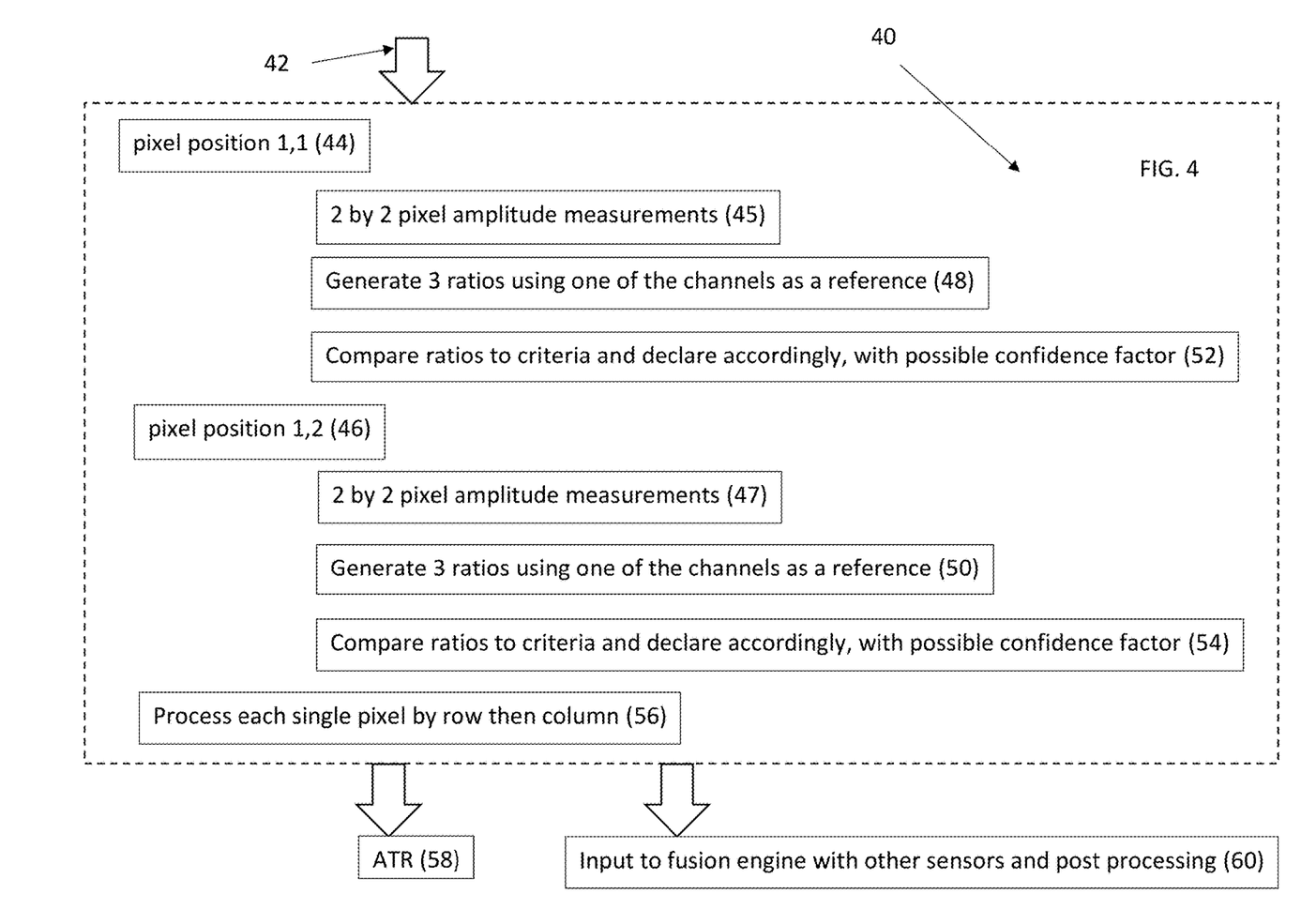
FIG. 4 is a diagram of one embodiment of a hyperspectral VIS/SWIR target identification system according to the principles of the present disclosure.

Referring to FIG. 4, a diagram of one embodiment of a hyperspectral target identification system according to the principles of the present disclosure is shown. More specifically, in this example an image 42 is processed at a first wavelength by a processor 40 by looking at a pixel position detected on an array 44 at a particular wavelength starting from some selected pixel position 44 and then looking at its right/next neighbor pixel and the two pixels below 46 to form a 2×2 pixel group. Amplitude measurements 45 are processed by measuring each of the four pixels in the group individually. This is repeated to generate ratios between each pixel pair to make a determination of friend or foe, or man-made or not, based on the ratios as discussed previously. This process is repeated by shifting a single pixel and repeating the process, pixel by pixel, row by row 56 of the original image over the entire frame. See, e.g. FIG. 3B and FIG. 4.

In some cases, the ratios are compared to a reference 48, 50. In addition, the ratio values can be compared to a confidence level that a determination can be made, 52, 54 ranging from mildly confidence (ratios within 80% of expected values) to strongly confidence (ratios within 95% of expected values) meeting the particular ratio criteria as a means sorting through both clutter and target ID evaluations. It is to be understood that by eliminating the vegetation and the ground from an image, a target in a 100 m by 100 m area may become self-evident in identifying the target and its location.

In certain embodiments, the system that this technology is applied to is dependent upon the mission. For example, where the processing capacity for a system is very limited, such as in a very small UAS or on a munition, the clutter removing power of the FPGA would be contained in a 1 by 1 inch Circuit Card Assembly (CCA), such that there is a sensor on one side and an FPGA on the other. By applying the spectral filter in the FPGA, the clutter features of the scene (e.g., vegetation) have been eliminated and only imagery of possible targets remain. In the case of a larger UAS or munition, the imagery would be further processed by Automatic Target Recognition (ATR) 58 software could be employed, or the like, to differentiate between target types based on a priority list. The priority list is based on the targets of interest and the predetermined order in which the targets are prosecuted. The decision could be based on the level of ID confidence, priority of the target, and/or the ability of the weapon to execute a maneuver to ensure a successful engagement, for example.

In the case of a fire control system where more complex processing is available along with additional sensors, a fusion approach 60 could be applied in which case additional sensor data could be used in the ratio determinations. In all cases, the additional information for the hyperspectral analysis provides the operation (fire control system) or the munition with the ability to strip trees, soil, and rock, from an image and find man-made objects and possibly even identify friend or foe depending the sensors' band selections.

Figure 5:
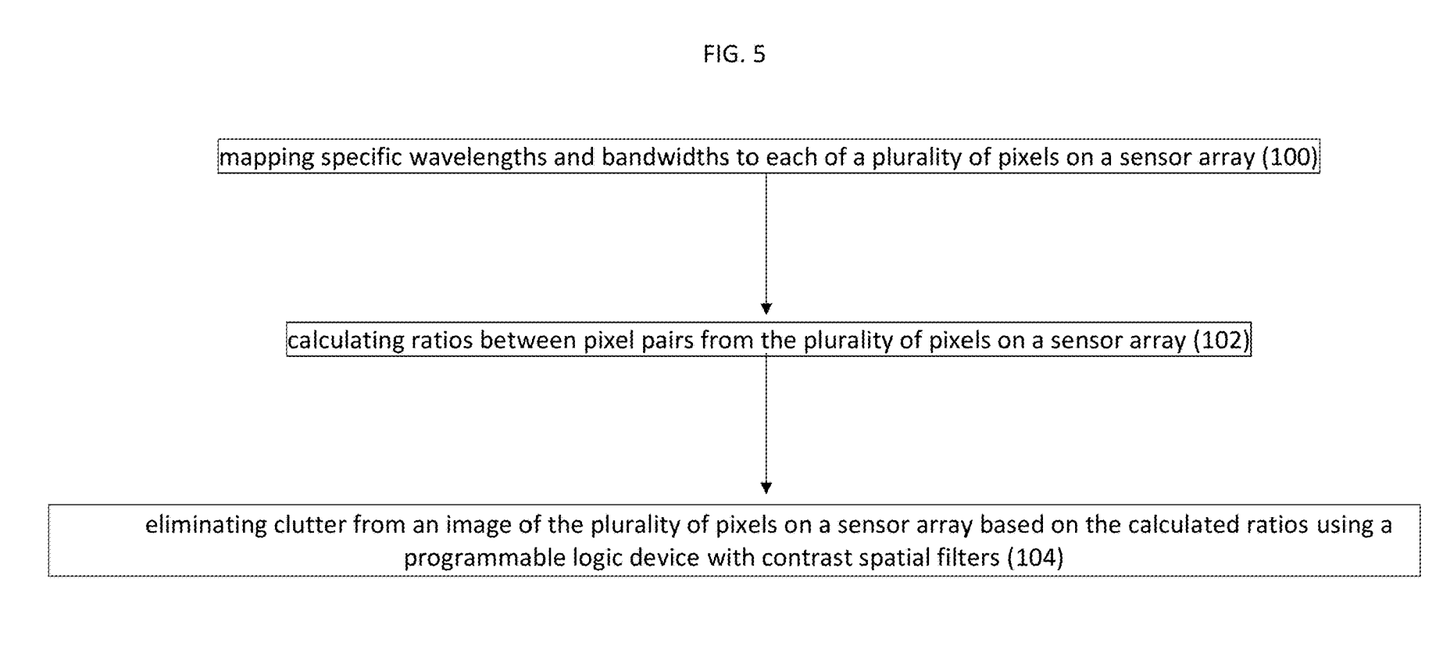
FIG. 5 is a flowchart of one embodiment of a method according to the principles of the present disclosure.

Referring to FIG. 5, a flowchart of one embodiment of a method according to the principles of the present disclosure is shown. More specifically, hyperspectral target identification is possible by mapping specific wavelengths and bandwidths to each of a plurality of pixels (by optical filters) on an FPGA sensor array or other programmable logic device 100. Ratios between pixel pairs are calculated from the plurality of pixels on an FPGA sensor array, 102, wherein at least four pixels (2×2) are used for calculating ratios and one of the four pixels is used as a reference pixel. Clutter is eliminated from an image comprising the plurality of pixels on an FPGA sensor array based on the calculated ratios using contrast spatial filters to provide near real-time processing 104. The clutter that is eliminated would be those features such as soil and vegetation such that the image processing (ratios indicating vegetation or soil) can be flagged as clutter and the focusing on the remaining imagery for ATR target determination; thereby cutting down the ATR processing time.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for hyperspectral target identification, comprising: mapping specific wavelengths and bandwidths to each of a plurality of pixels in a cluster within a sensor array using a series of optical filters for specific clutter signatures; calculating ratios between pixel pairs from the plurality of pixels on the sensor array, wherein at least four pixels are used for calculating ratios and one of the four pixels is used as a reference pixel; and eliminating clutter from an image comprising the plurality of pixels on the sensor array based on the calculated ratios using a programmable logic device having contrast spatial filters.

2. The method for hyperspectral target identification according to claim 1, wherein the programmable logic device is an FPGA.

3. The method for hyperspectral target identification according to claim 1, wherein the elimination of clutter includes the removal of vegetation from the image.

4. The method for hyperspectral target identification according to claim 1, wherein the elimination of clutter from the image further comprises using confidence levels to determine whether an object is vegetation, water, soil, or some other object.

5. The method for hyperspectral target identification according to claim 1, further comprising determining whether an object in the image is friend or foe.

6. The method for hyperspectral target identification according to claim 1, wherein the at least four pixels is a 2×2 pixel grouping a $1^{st}$ pixel is full band of the sensor, a $2^{nd}$ pixel is 1.05 µm, a $3^{rd}$ pixel is 1.50 µm, and a $4^{th}$ pixel at 1.95 µm, wherein the wavelengths are defined by the spectral response of the target and the clutter to be removed.

7. The method for hyperspectral target identification according to claim 1, wherein the method continues by shifting a single pixel and repeating the process, pixel by pixel, row by row across the plurality of pixels on a sensor array.

8. The method for hyperspectral target identification according to claim 1, further comprising using automatic target recognition (ATR) to differentiate between target types based on a priority list.

9. The method for hyperspectral target identification according to claim 1, further comprising using a fusion approach comprising additional sensor data and post processing.

10. A method for hyperspectral target identification, comprising: mapping specific wavelengths and bandwidths to each of a plurality of pixels on an FPGA sensor array; calculating ratios between pixel pairs from the plurality of pixels on the FPGA sensor array, wherein at least four pixels (2×2) are used for calculating ratios and one of the four pixels is used as a reference pixel; and eliminating clutter from an image comprising the plurality of pixels on the FPGA sensor array based on the calculated ratios using contrast spatial filters to provide real-time processing.

11. The method for hyperspectral target identification according to claim 10, wherein the elimination of clutter include the removal of vegetation from the image.

12. The method for hyperspectral target identification according to claim 10, wherein the elimination of clutter from the image further comprises using confidence levels to determine whether an object is vegetation, water, soil, or some other object.

13. The method for hyperspectral target identification according to claim 10, further comprising determining whether an object in the image is friend or foe.

14. The method for hyperspectral target identification according to claim 10, wherein in a 2×2 pixel grouping a $1^{st}$ pixel is full band of the sensor, a $2^{nd}$ pixel is 1.05 µm, a $3^{rd}$ pixel is 1.50 µm, and a $4^{th}$ pixel at 1.95 µm, wherein the wavelengths are defined by the spectral response of the target and the clutter to be removed.

15. The method for hyperspectral target identification according to claim 10, wherein the method continues by shifting a single pixel and repeating the process, pixel by pixel, row by row across the plurality of pixels on an FPGA sensor array.

16. The method for hyperspectral target identification according to claim 10, further comprising using automatic target recognition (ATR) to differentiate between target types based on a priority list.

17. The method for hyperspectral target identification according to claim 10, further comprising using a fusion approach comprising additional sensor data and post processing.

18. A computer program product comprising one or more non-transitory machine-readable mediums encoded with instructions that when executed by one or more processors cause a process to be carried out for hyperspectral target identification, the process comprising: mapping specific wavelengths and bandwidths to each of a plurality of pixels on an FPGA sensor array; calculating ratios between pixel pairs from the plurality of pixels on the FPGA sensor array, wherein at least four pixels (2.times.2) are used for calculating ratios and one of the four pixels is used as a reference pixel; and eliminating clutter from an image comprising the plurality of pixels on the FPGA sensor array based on the calculated ratios using contrast spatial filters to provide real-time processing.

* * * * *